Nov. 1, 1927.
S. N. BRACH
DIRIGIBLE ENGINE HEADLIGHT
Filed Jan. 16, 1926
1,647,559
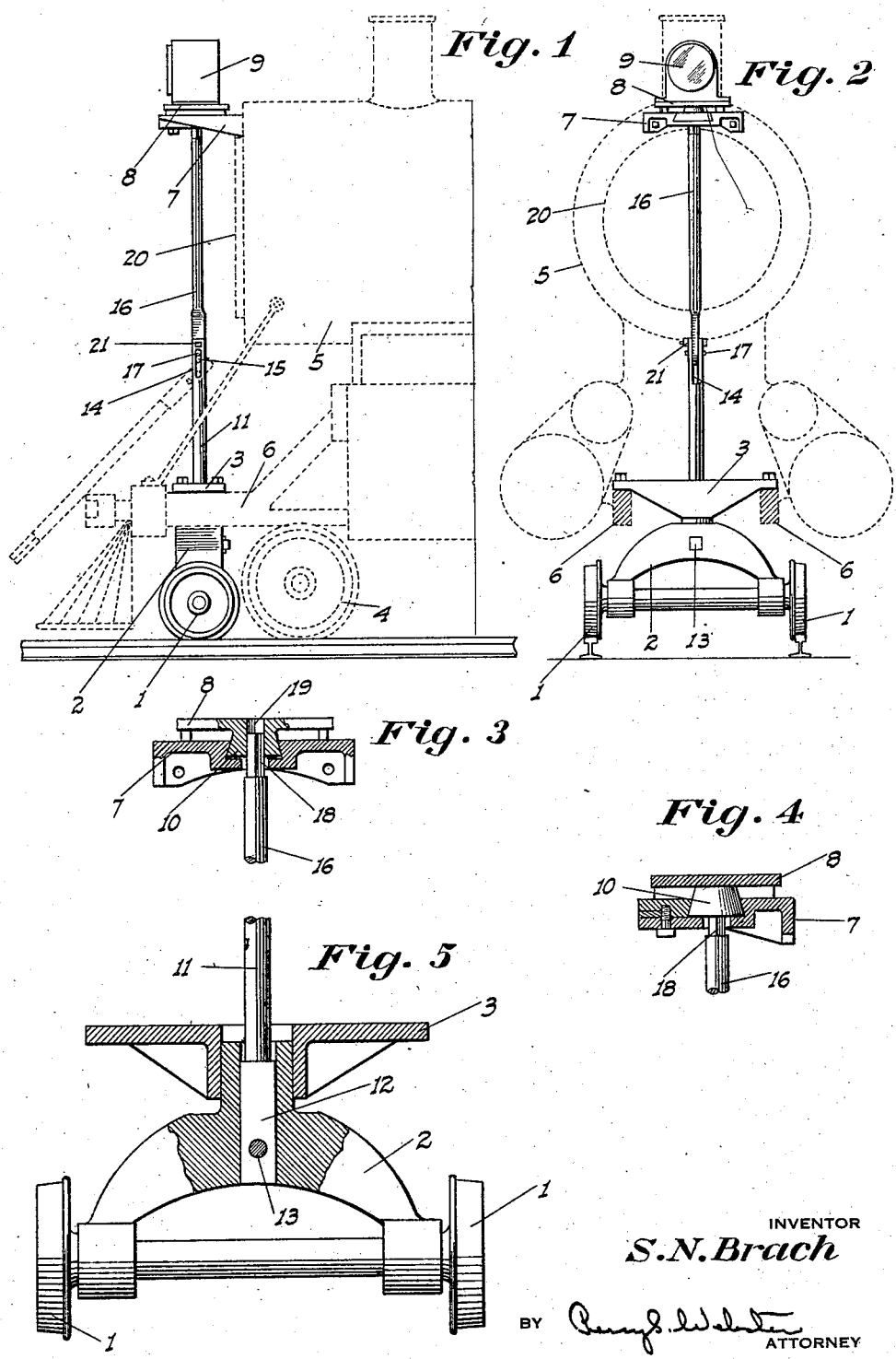
INVENTOR
S. N. Brach
BY
ATTORNEY Patented Nov. 1, 1927.

1,647,559

UNITED STATES PATENT OFFICE.

STEVE N. BRACH, OF STOCKTON, CALIFORNIA.

DIRIGIBLE ENGINE HEADLIGHT.

Application filed January 16, 1926. Serial No. 81,695.

This invention relates to a dirigible headlight for locomotives, my principal object being to provide a headlight structure which will automatically cause the headlight to turn to follow a curve when the engine is rounding the same. In this manner the light from the headlight will show more directly along a curved section of track than is the case with the present fixed headlights. This device of course has no value on straight stretches or where but few curves of large radius are traversed, but on winding and sharp curved mountain roads it should be a very valuable feature, enabling the engineer to better see the track than is now possible on such railroads. The possibility of accidents due to obstructions on the track, rail breakage or other causes of disaster is therefore lessened on locomotives equipped with my structure, over those having the usual fixed headlights.

Another object is to provide a structure for the purpose capable of being applied to standard locomotives, with but few if any alterations being necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of the apparatus as applied to a locomotive.

Fig. 2 is a front end view of the same.

Fig. 3 is a transverse section of the headlight supporting structure.

Fig. 4 is a longitudinal section of the same.

Fig. 5 is a front view partly in section of the swivel truck and its supporting means.

Referring now more particularly to the characters of reference on the drawings, the numeral 1 denotes a pair of rail engaging wheels mounted on a truck 2, which truck in turn has a central spindle turnably mounted in a bolster 3. The truck is intended to be located just ahead of the leading wheels 4 of the locomotive, so as to be ahead of the smoke box 5 of the boiler. The bolster 3 is of course supported by and rigidly secured to the front end of the main frames 6 of the engine.

Fixed onto the boiler at a suitable level and projecting ahead of the same is a bracket 7 superimposed on which is a platform 8 which forms a support for the headlight 9 which is rigidly fixed thereon. The platform has a centrally located member 10 therein which is turnably mounted in the bracket, so that the platform 8 forms a turntable. The center of this turntable is alined with the vertical center of turning of the truck 2.

A stem 11 projects upwardly from the truck and bolster centrally thereof, the lower portion 12 of the stem being of rectangular form and removably fitting in a bore of similar shape provided in the truck. The portion 12 is held against undesired removal by a bolt 13 passing through said portion and the truck.

The upper end of the stem is about on a level with the bottom of the smoke box and is forked as at 14, the forks being provided with transverse and vertically extending slots 15.

Projecting between the forks is the lower end of another stem 16, a pin 17 in the latter projecting laterally through the slot so that the stems 11 and 16 will turn together. The upper end of the stem 16 is square as at 18 to slidably fit in a square bore 19 in the turntable member 10.

The length of the slot 15 is such as to permit of a downward movement of the pins 17 sufficient to clear the upper end 18 of the stem from the turntable, thus enabling said stem to be then swung forwardly and down as indicated in Fig. 1. This permits of the necessary opening of the door 20 of the smoke box, without interfering with the headlight attachment and without having to remove any part. The stem 16 is normally held from downward movement by a bolt 21 passing through the forks 14 and the portion of the stem 16 which extends therebetween.

In operation it will be seen that as the wheels 1 strike a curve in the track the truck 2 will swivel ahead of the main wheels of the locomotive. The stem structure being non-turnably mounted on the truck, they will turn with any movement of the latter and will impart a similar turning movement to the headlight.

The truck is free for a certain amount of vertical movement in the bolster to take care of the vertical movement of the latter with the movement of the main frames, and the stem 16 is slidable in the headlight turntable so as to allow of the necessary freedom of vertical movement of the stem relative to the turntable, which is immovably mounted relative to the boiler and the main frames of the engine.

Although in the present instance the wheels 1 of the truck are not shown as carrying any of the engine load they can, if desired, be mounted onto an engine so that said truck itself will take the place of the pony truck used on various locomotives.

Also, while I have described this attachment as being particularly intended for use on steam locomotives, it will be evident that the device may be applied to electric locomotives and any power driven railway vehicles.

From the foregoing description it will be readily seen that I have produced such a device as substantially fulfills the objects of the invention as set forth herein.

While this specification sets forth in detail the present and preferred construction of the device, still in practice such deviations from such detail may be resorted to as to not form a departure from the spirit of the invention as defined by the appended claims.

Having thus described my invention what I claim as new and useful and desire to secure by Letters Patent is:

1. A dirigible headlight for a railway vehicle including a swivel wheel truck, means for mounting the truck on the vehicle, a bracket fixed on the vehicle above the truck, a headlight supporting platform turnably mounted on the bracket, the platform being centered in vertical alinement with the center of swivel movement of the truck, a stem fixed in and projecting up from the truck centrally thereof, an upper stem pivotally connected to the lower stem for turning movement in a vertical plane, and the upper end of said upper stem having slidable and removable but nonturning connection with the platform.

2. A dirigible headlight structure for a railway vehicle having a swivel wheel truck comprising a bracket fixed on the vehicle above the truck, a headlight supporting platform turnably mounted on the bracket and connection means between the truck and platform, said connection means comprising a vertical stem fixed in and projecting upwardly from the truck, an upper stem mounted in non-turnable but vertically movable and swinging connection with the lower stem, the upper end of the upper stem having non-turning connection with the platform but being removable therefrom upon the downward movement of the upper stem, and means normally preventing such downward movement.

In testimony whereof I affix my signature.

STEVE N. BRACH.